United States Patent
Li et al.

(10) Patent No.: US 9,639,275 B2
(45) Date of Patent: May 2, 2017

(54) MANAGING DATA WITHIN A STORAGE DEVICE BASED ON FILE SYSTEM METADATA

(71) Applicant: Seagate Technology LLC, Cupertino, CA (US)

(72) Inventors: Peng Li, Shakopee, MN (US); Richard Esten Bohn, Shakopee, MN (US); David Tetzlaff, Minnetonka, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 100 days.

(21) Appl. No.: 14/453,200

(22) Filed: Aug. 6, 2014

(65) Prior Publication Data

US 2016/0041778 A1    Feb. 11, 2016

(51) Int. Cl.
*G06F 12/00* (2006.01)
*G06F 3/06* (2006.01)

(52) U.S. Cl.
CPC ............ *G06F 3/061* (2013.01); *G06F 3/0616* (2013.01); *G06F 3/0643* (2013.01); *G06F 3/0674* (2013.01); *G06F 2003/0692* (2013.01)

(58) Field of Classification Search
None
See application file for complete search history.

(56) References Cited

U.S. PATENT DOCUMENTS

| | | | |
|---|---|---|---|
| 6,119,118 A | 9/2000 | Kain, III et al. | |
| 6,823,398 B1 | 11/2004 | Lee et al. | |
| 7,970,919 B1 | 6/2011 | Duran | |
| 8,005,801 B2 | 8/2011 | Kazan et al. | |
| 8,352,435 B1 * | 1/2013 | Ruef | G06F 11/2066 365/201 |
| 8,386,443 B2 | 2/2013 | Brueggemann et al. | |
| 8,478,799 B2 | 7/2013 | Beaverson et al. | |
| 8,612,404 B2 | 12/2013 | Bone et al. | |
| 8,843,459 B1 * | 9/2014 | Aston | G06F 17/30067 707/694 |
| 2005/0114614 A1 * | 5/2005 | Anderson | G06F 11/1464 711/162 |
| 2008/0086600 A1 * | 4/2008 | Qiao | G06F 17/30132 711/133 |
| 2009/0063561 A1 | 3/2009 | Sayko et al. | |
| 2010/0297933 A1 * | 11/2010 | Sim | H04H 20/08 455/3.05 |
| 2011/0055297 A1 * | 3/2011 | Maeda | G06F 3/0613 707/824 |
| 2012/0084270 A1 | 4/2012 | Jayaraman et al. | |
| 2012/0124319 A1 * | 5/2012 | Kirvan | G06F 3/061 711/170 |
| 2014/0289492 A1 * | 9/2014 | Ranjith Reddy | G06F 3/0613 711/170 |

* cited by examiner

*Primary Examiner* — Daniel Tsui
(74) *Attorney, Agent, or Firm* — Hollingsworth Davis, LLC

(57) ABSTRACT

Commands associated with one or more logical block addresses are received via a host interface of a storage device. Based on a timing and sequence of the commands, an extent of a file that contains the logical block addresses is determined, the file being stored on the storage device. The logical block addresses are managed internally as a unitary data structure based on determining an association between the logical block addresses and the file.

17 Claims, 3 Drawing Sheets

MANAGING DATA WITHIN A STORAGE DEVICE BASED ON FILE SYSTEM METADATA

BACKGROUND

Persistent storage devices such as hard disk drives (HDD) and solid-state drives (SSD) are widely utilized in products ranging from data center servers to inexpensive embedded devices. Storage devices generally employ an input-output interface (referred to herein as the "host interface") to communicate with a controlling device, e.g., central processing unit of a computing device. For a large number of storage devices, the host interfaces utilizes a block storage protocol. A block storage protocol provides a limited amount of information to the storage device, such as a logical block address (or range thereof) and storage operations (e.g., read, write, verify) be performed on the logical block address.

A user of the computing system generally interacts with the storage device via a filesystem. A filesystem may be provided by an operating system, e.g., through a driver and user interface. The filesystem, among other things, defines files (e.g., location, size, permissions, etc.), hierarchies (e.g., folder/directory structures), and interactions (e.g., open, close, edit, delete). The filesystem maps structures that define the files to block addresses that are used by the storage device. The block addresses may be sectors or a logical block addresses (LBAs) used by devices such as HDDs and SSDs.

The operating system and the storage device see stored data at different levels of abstraction. This provides flexibility, interoperability, and extensibility for the system as a whole. For example, the higher-levels of the operating system can access different filesystems via the same interface and different filesystem drivers. The storage device can be used with nearly any filesystem, as the block storage interface is not filesystem specific.

SUMMARY

The present disclosure is related to storage devices. In one embodiment, methods and apparatuses facilitate managing data within a storage device based on file system metadata. In one embodiment, methods and apparatuses facilitate receiving commands via a host interface of a storage device. The commands are associated with one or more logical block addresses. Based on a timing and sequence of the commands, an extent of a file that contains the logical block addresses is determined. The file is stored on the storage device. The logical block addresses are managed internally as a unitary data structure based on determining an association between the logical block addresses and the file.

In another embodiment, methods and apparatuses facilitate determining, via a controller of a storage device, filesystem metadata stored on media of the storage device. Commands are received via a host interface of a storage device. The commands are associated with one or more logical block addresses. Based on the filesystem metadata, an extent of a file that contains the logical block addresses is determined. The file is stored on the storage device. The logical block addresses are managed internally as a unitary data structure based on determining an association between the logical block addresses and the file.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures. The drawings are not necessarily to scale.

DETAILED DESCRIPTION

This disclosure generally relates to use of a data storage device that analyzes content and access patterns of user data. In some instances, the storage device may be able to use this information to detect file system metadata, and use the filesystem metadata to effectively manage the data as unitary data structures, e.g., individual files. File system tables/journals, etc. This can be used for actions such as compression, defragmentation, use of caching, selecting a tier of storage, allocating of resources, determination of random versus sequential predicted access, managing wear leveling and garbage collection, etc. Even if the file system cannot be expressly detected, various usage patterns may indicate regions that store particular types of content, and this content can be similarly managed to improve performance.

A storage device as described herein may be configured as a legacy storage device, e.g., handling host data storage and retrieval requests using existing host protocols. While some protocols (e.g., SCSI OSD) may allow the host to describe files as objects and not just blocks, the present embodiments do not require extensions to existing block storage interfaces (e.g., SATA, SAS, SCSI, IDE, etc.). This provides smart management of stored data to improve reliability, utilization, performance, etc., while maintaining backwards compatibility.

Figure 1:
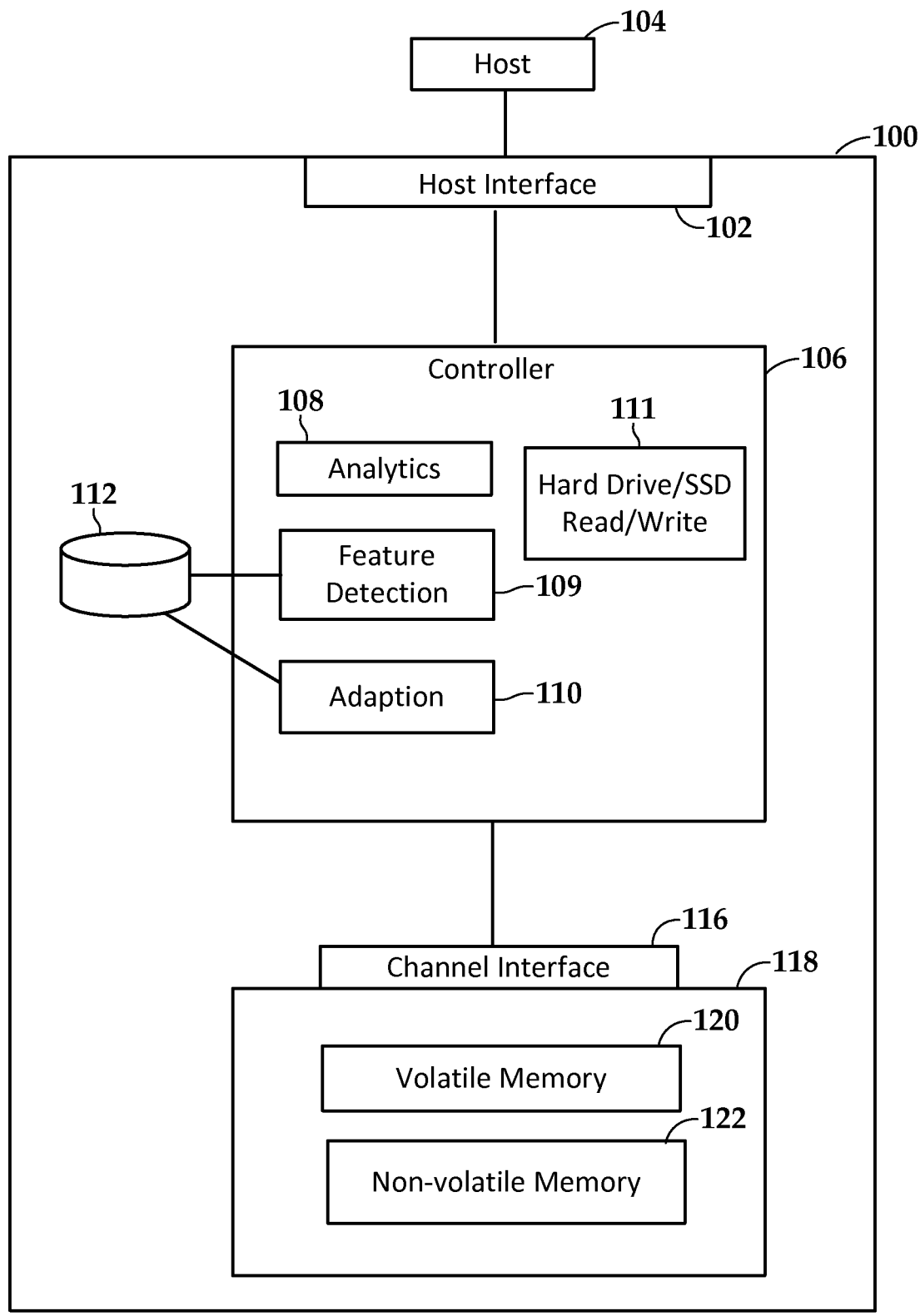
FIG. 1 is a block diagram of a storage device according to an example embodiment.

In FIG. 1, a block diagram shows a storage device 100 according to an example embodiment. The storage device 100 may provide capabilities often associated with data storage devices, e.g., storing and retrieving blocks of data, and may in addition include data pattern detection abilities as noted above. Generally, the storage device 100 includes a host interface 102 configured to communicate with a host 104 (e.g., computer system, storage array controller, etc.). The host interface 102 may use electrical specifications and block access protocols associated with existing hard drive host interfaces, such as SATA, SAS, PCIe, Fiber Channel, USB, etc.

The storage device 100 includes a controller 106. The controller 106 includes hardware such as general-purpose and/or special-purpose logic circuitry configured to perform functions of the storage device 100, including functions indicated in functional blocks 108-111. Functionality may be implemented at least in part via firmware or software running on the logic circuitry. Functional block 111 provides legacy storage functionality, such as read, write, and verify operations on stored data and other procedures. Blocks 108-110 represent specialized functionalities that allow the storage device 100 to analyze the user data and adapt operations of the functional block 111 in response.

An analytics block 108 looks at data interactions between the host 104 and the storage device 100. For example, the analytics block 108 may look at sectors or logical block addresses (LBAs) associated with read and write requests and analyze the addresses, e.g., via a histogram. This may be used to detect regions of the address space, such as filesystem journals/metadata, user files, content type, partition boundaries, virtual memory files/partitions, etc. These aspects are referred generally herein as "features" and are generally associated with a filesystem that is ultimately defined and maintained by the host 104.

The analytics block 108 may also be able to analyze various known data structures used on storage devices in order to determine filesystem features. As will be described below, a master boot record may be stored on the first few sectors of the storage device. This record uses known conventions to define partitions on the hard drive, and can also be used as a reference to find filesystem features, e.g., based on a fixed offset of the starting address of the blocks.

A feature detection block 109 uses features of interest detected by the analytics block 108. One or both of the analytics block 108 and feature detection block can store records of the features in a database 112. The database 112 may be indexed by LBA, and may include definition of various features, such as type of feature (e.g., filesystem metadata, user file), extents of the feature (e.g., LBAs and/or physical addresses), and management policies associated with the feature (e.g., do not cache, treat as random/sequential, compress, adjust garbage collection policy for affected pages, increase/decrease error correction coding). Such management policies can be used by an adaptation block 110 that guides how certain data associated with the data is stored via a channel interface 116.

Generally, the channel interface 116 is used to access memory 118, e.g., for persistence storage and retrieval based on requests from the host 104. The memory 118 may include both volatile memory 120 and non-volatile memory 122. The volatile memory 120 may be used for caching non-volatile memory, e.g., for predictive retrieval, storing frequently updated data, etc. The volatile memory 120 may also be used by the controller 106, e.g., for storing instructions and data used for operating the data storage device 100. The volatile memory 120 may include different types of memory, e.g., dynamic random access memory (DRAM), static random access memory (SRAM), etc.

The non-volatile memory 122 includes media that persistently stores host data, as well as data used internally by the storage device 100. The non-volatile memory 122 may include multiple types of storage memory, including non-volatile solid-state memory (e.g., flash memory, resistive memory, phase-change memory, magnetoresistive memory) and magnetic storage media (e.g., hard disk). The multiple types of storage may be configured in a hybrid or tiered arrangement. A hybrid arrangement may involve using a faster class of memory (e.g., flash memory) as a non-volatile cache that is placed in front of a slower class of memory (e.g., disk). The non-volatile cache may include data that is duplicated between the different classes of memory, or data may be stored in only one class. Generally, the data is moved/copied between the types of memory based on conditions of use, e.g., read-ahead, hotness, etc.

A tiered data structure generally involves storing data in one of a particular class of memory, where the data does not often migrate between the different memory classes based on conditions of use. For example, if a data object is a large, read-only, sequentially accessed file, it may be more efficient to store it in a tier of memory that may have high latency (e.g., seek time) but high sequential throughput and large storage capacity. In contrast, smaller data objects that are regularly changed and/or random may be stored in a class of memory that has fast random read/write performance.

Generally, the different classes of media described above may include different categories of the same media. For example, the non-volatile memory 118 may include different types of flash memory, such as multi-level cell (MLC), single-level cell (SLC), NAND flash, NOR flash, etc. Similarly, a single type of media may be formatted and/or configured in a different way that differentiates performance. For example, a magnetic disk may have a first portion that use typical data sectors and a second portion that utilizes shingled writing. The first portion may offer increased random write performance relative to the second portion, but lower areal density.

Generally, a filesystem includes data structures that define at least the extent and relation of files to facilitate storage and retrieval from the storage device. File systems include metadata that is also stored to the storage device. The metadata at least defines a name, location, and extent of files, as well as organizational data, e.g., locations within a folder/directory hierarchy. The metadata may define other aspects of the file, such as permissions, filename, creation/modification times, content type, etc. Example filesystems include NTFS and FAT variations that are associated with Microsoft operating systems. Other example file systems include XFS, UFS and ext variations that are generally associated with Unix or Linux operating systems.

Generally, the file system metadata will take a small fraction of the total storage space, and may be stored in a predefined region or regions of the storage device. Under some conditions, the metadata may be accessed more often than the files the metadata describes. For example, command line or graphical user interfaces provide a way to display lists of files on the system within folders, and this can be achieved by reading the metadata. Further, when a file is accessed via a system command, e.g., fopen ("path", "permissions"), the metadata may first be read from the disk the ensure the specified file exists and can be opened. The operating system may cache some part of the file system metadata in RAM, but even in such a case the metadata may need to be synced with the storage device as the file data is changed.

Figure 2:
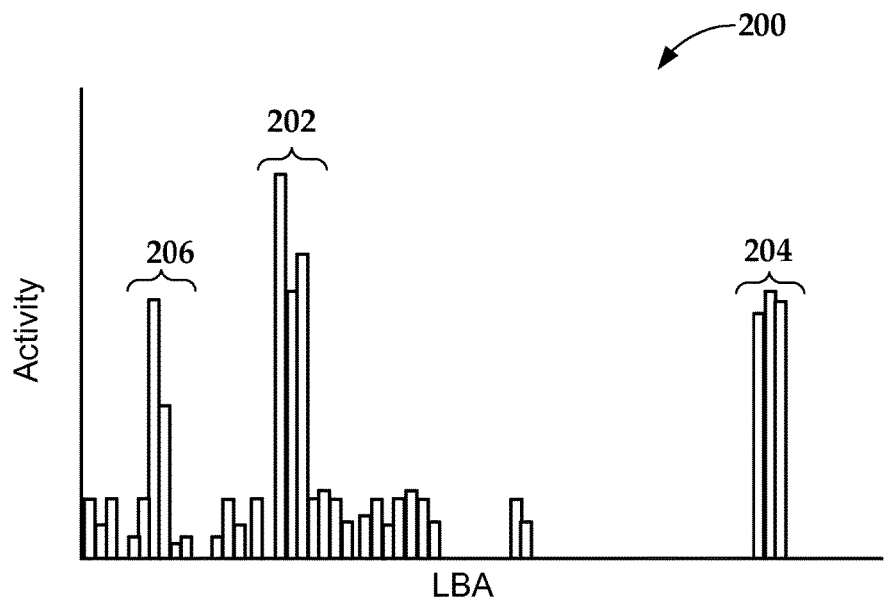
FIG. 2 is a histogram illustrating how filesystem metadata may be detected based on host interface activity according to an example embodiment.

In reference now to FIG. 2, a graph 200 illustrates how journaling activity versus file storage/retrieval activity may be distinguished according to a first example embodiment. The graph 200 is a histogram of activity (e.g., reads, writes, or a combination thereof) affecting sectors or LBAs of a storage device. For purposes of this disclosure, the terms "LBA" and "sector" are used interchangeably, and usage of one or the other of these terms does not imply the associated description is only applicable to, e.g., SSD or HDD devices.

The bars of the histogram 200 each indicate an LBA range, and their height is based on a count LBAs within the range being accessed, e.g., over a particular time period. This count value may be scaled based on a size of the access request, such that smaller read/write requests (possibly associated with metadata) get higher weighting than larger requests (possibly associated with files or other large data structures). This will tend to emphasize areas where metadata-type activity is occurring. Regions 202, 204 indicate higher levels of activity, and so may be considered as potentially containing file system metadata. This could cause these ranges 202, 204 to be managed differently than other LBAs, e.g., given higher local cache priority, stored in a tier with higher reliability, higher random access speed, etc. Further, the ranges 202, 204, could be scanned for patterns (e.g., text strings, binary values) that might indicate the starting point and type of file system metadata.

As indicated by region 206, other regions may also experience a peak of activity, although in this example the activity is less than regions 202, 204. This type of activity may be seen, for example, for a region dedicated to virtual memory by the operating system. Generally, the operating system may move less-used portions of RAM into persistent storage if total RAM usage exceeds a threshold. This may result in a relatively small region of the LBA space seeing significant activity or reading/writing small amounts of data if there is significant swapping between RAM and virtual memory.

The region 206 may have characteristics that help distinguish it from file system metadata. For example, even though the operating system may allocate some amount of virtual memory at start up (in some cases dedicating a partition to virtual memory), it generally will not be accessed much thereafter until RAM usage exceeds a limit. In contrast, regions 202, 204 will generally experience a consistent level of activity during use, or even the inverse. For example, if the operating system caches a portion of file system metadata upon start up, the system may experience a significant amount of activity in at least part of the regions 202, 204 upon startup, and thereafter much less.

The example shown in FIG. 2 may be extended to include multiple histograms or other statistical measures. For example, different histograms may be used for read requests and write requests, and the results utilized differently. The use of histogram or other statistical analysis are only one example of how a storage device may determine various structures stored in persistent memory by the host. In another example, a neural network component could be trained on a wide variety of storage devices, analyzing both address ranges and temporal sequences. Certain patterns, such as short access to one tightly defined region followed by longer access to a more broadly defined region may be used to categorize metadata space and file space within the storage device.

In some cases, the storage device may be able to determine the metadata based on other characteristics. For example, a storage device configured as a boot device will have a master boot record (MBR) that contains the partition table for the disk. If the disk is a bootable disk, there will be a small amount of code in the MBR that is used by computer firmware (e.g., Basic Input/Output System—BIOS or Unified Extensible Firmware Interface—UEFI) to find the boot sector/LBA. Some file systems will store the starting address of the metadata at a known offset from the boot sector/LBA. As such, the storage device may include the ability to detect the file system and utilize at least some of the metadata.

For example, a file system will have a beginning sector/LBA for a structure such as master file table (MFT) for NTFS-type file systems or a superblock for ext-type file systems. If the structure is on the first partition, the beginning sector/LBA may be located at a known offset of from the boot sector. Or, if the partition table can be read, the beginning sector/LBA can be determined based on the first sector/LBA of the partition. This starting address will have identifying data (e.g., a text string, magic number) identifying the file system, followed by other data that describes the file systems (e.g., inodes, file records). The partition table may also be used to determine the type of file systems.

Assuming the storage device can determine this information, it can determine the same data about files and hierarchies available to the operating system. The storage device need not access or understand all of the features of the file system, e.g., permissions, time stamps, tags, etc. Generally, a compact and simplified file system analyzer can determine location of file system metadata and extent and names of files. This can be used to treat requests affecting logical block addresses as unitary data structures based on determining they are associated with a file. For example, the name of the file can be used to determine content stored in the file, and this can be used to make decisions about compression of the file, storage of the file data in one of a plurality of tiers, caching, fragmentation of the file, etc. In other cases, the content of the file itself can be examined to determine its content, e.g., via an indicator stored at the beginning of the file.

In some cases, it may not be possible for the storage device to determine particular file system metadata. For example, if the storage device is part of a RAID array where data is spread across physical disks (known as "striping"), then a particular one of the disks may not have only parts of the file system data or none at all (e.g., storing checksum data). As such, the nature of the data (e.g., file system metadata versus files/user data) may be generally determined using patterns such as shown in FIG. 2.

Although a storage device may be able to access file system data, this data may not be arranged in such a way to facilitate reverse lookups. For example, the file system generally maps file structures (e.g., records, inodes) to sectors/LBAs, so that when a file is accessed, its file structure identifiers are used as an index to find the LBAs where the file is stored. In contrast, the storage device will receive a request associated with one or more sectors/LBAs, which would involve a reverse lookup to find file system data associated with the sectors/LBAs. Further, the sector/LBA may be within a range that defined by its extents, e.g., start address and length, instead of listing each sector/LBA within the file.

Figure 3:
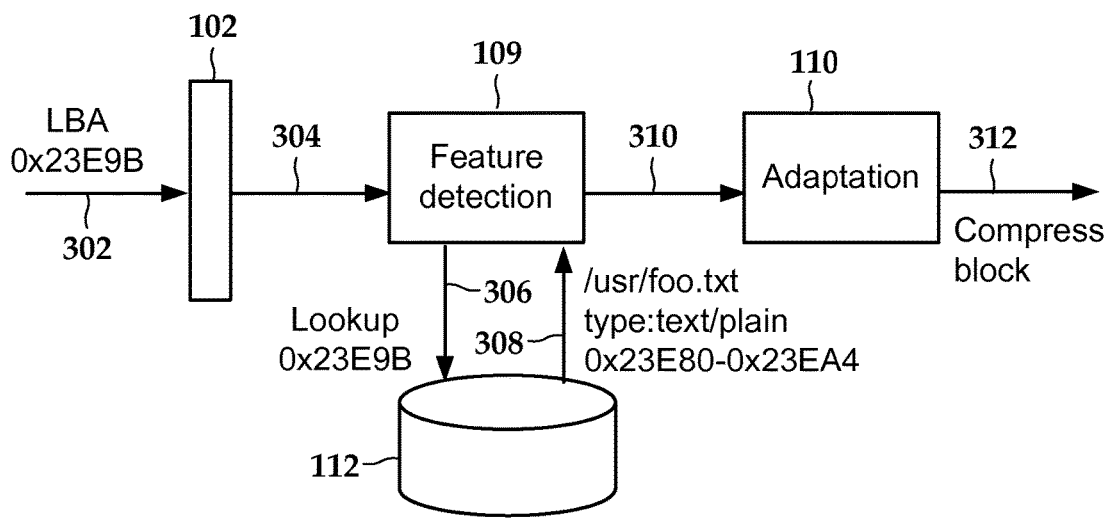
FIG. 3 is a block diagram illustrating operation of a feature detection module and object database according to an example embodiment.

In FIG. 3, a block diagram shows how stored object description data may be retrieved in a storage device (e.g., storage device 100 shown in FIG. 1) according to an example embodiment. A request 302 is received via the host interface 102. The request 302 references one or more LBAs, and may include a write or a read request. If the former, the request 302 may be for creating or updating an object (e.g., file). At least a portion 304 of the request data, e.g., the affected LBA(s), is sent to feature detection block 109. The feature detection block 109 performs a lookup 306 in database 112. In this example, the database 112 is configured as a spatial database.

Generally, a spatial database facilitates lookups using a spatial index. The spatial index will return a result for any objects having regions that encompass the spatial index. In this example, the spatial region may be one-dimensional and include LBA ranges, and the associated objects may include files, file system metadata, drive metadata (e.g., MBR), etc. In this example, the lookup 306 returns information 308 that describes a file object, including the file's name, content type, and full extents. At least a portion 310 of the information 308 is sent to the adaptation block 110 for further processing. In this case, the adaptation module 110 sends an indication 312 to compress the block or blocks.

The storage device may compress the entire file object using a known format (e.g., LZW compression) after the file is initially stored. In such a case, if the request 302 is to update part of the file, the compression may involve uncompressing the file, making the indicated change to the file, and recompressing the file. In other cases, the blocks may be compressed individually, and so only the updated block or blocks would need to be compressed and stored to replace the old compressed blocks.

The database 112 may return other types of data in response to queries. For example, if the storage device cannot determine specific file information, the return may be a category such as "file system metadata," "user file data," "virtual memory," "sequential data," "read-only data," etc. The adaptation module 110 may adjust its action appropriately, e.g., adjusting caching policies, garbage collection policies, wear-leveling policies, selecting a tier for storage, moving to a different tier of storage, preventing or allowing fragmentation, etc.

Figure 4:
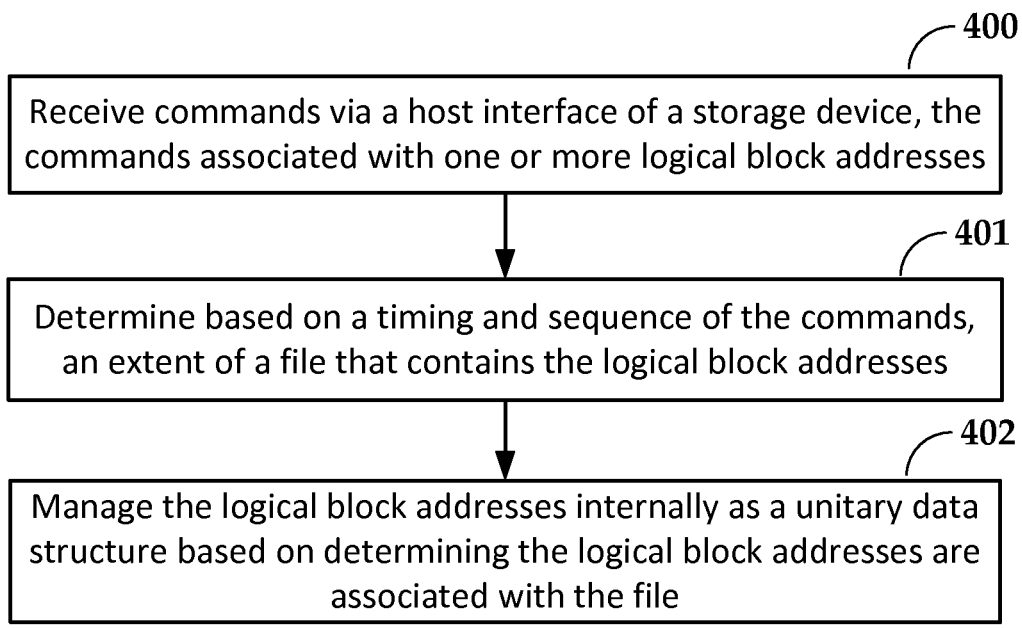
FIGS. 4 and 5 are flowcharts illustrating methods according to example embodiments.

In reference now to FIG. 4, a flowchart illustrates a method according to an example embodiment. The method involves receiving 400 commands via a host interface of a storage device. The commands associated with one or more logical block addresses (or sectors). Based on a timing and sequence of the commands, an extent of a file stored on the storage device that contains the logical block addresses is determined 401. The logical block addresses are managed 402 internally as a unitary data structure based on determining an association between the logical block addresses and the file.

Figure 5:
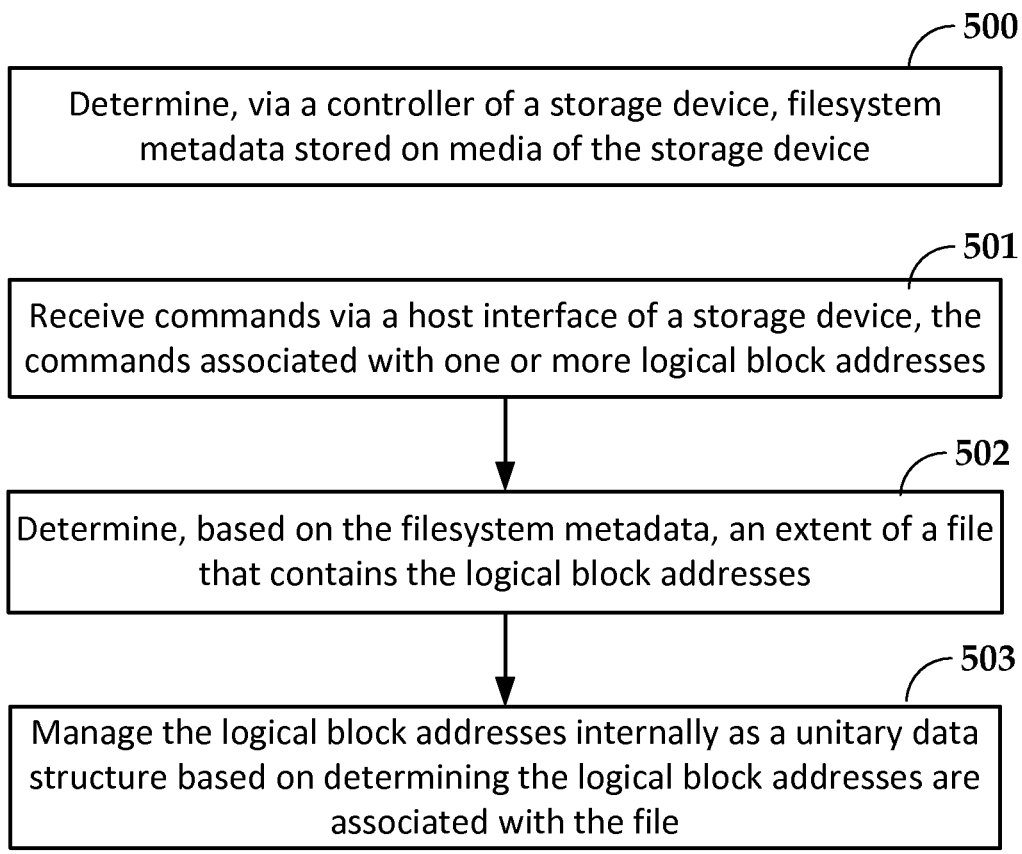

In reference now to FIG. 5, a flowchart illustrates a method according to another example embodiment. The method involves determining 500, via a controller of a storage device, file system metadata stored on media of the storage device. Commands are received 501 via a host interface of a storage device. The commands are associated with one or more logical block addresses. Based on the file system metadata, an extent of a file that contains the logical block addresses is determined 502. The logical block addresses are managed 503 internally as a unitary data structure based on determining an association between the logical block addresses and the file.

The file system metadata may be determined based on a master boot record stored on the storage device. The file system metadata may include a name of the file. In such a case, the logical block addresses may be managed further based on a content type of the file, the content type being determined based on the name of the file. In another case, the logical block addresses are managed further based on a content type of the file determined based header data within the file. Managing the logical block addresses may involve storing the file in a selected media tier of the storage device, compressing the file, and/or determining a frequency of access of the file and storing the file in physical memory location suitable for the frequency of access.

The various embodiments described above may be implemented using circuitry and/or software modules of an apparatus that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination and are not meant to be limiting, but purely illustrative. It is intended that the scope be limited not with this detailed description, but rather determined by the claims appended hereto.

What is claimed is:

1. A method comprising:
receiving commands via a host interface of a storage device, the commands associated with logical block addresses;
determining a histogram of activity over a period of time as a function of the logical block addresses based on the commands, wherein address ranges that show relatively high levels of activity in the histogram indicate regions of filesystem metadata;
determining, based on a timing and sequence of the commands associated with the regions of the filesystem metadata, an extent of a file that contains the logical block addresses, the file being stored on a persistent data storage medium of the storage device, wherein determining the extent of the file based on the timing and sequence of the commands comprises identifying the filesystem metadata and file space within the storage device based on a short access to the regions of the filesystem metadata followed by a longer access to another region used for the file space; and
managing storage of the logical block addresses to the persistent data storage medium as a unitary data structure based on determining an association between the logical block addresses and the file.

2. The method of claim 1, wherein managing the storage of the logical block addresses comprises one or more of storing the file in a selected media tier of the persistent data storage medium and compressing the file.

3. The method of claim 1, wherein managing the storage of the logical block addresses comprises determining a frequency of access of the file and storing the file in physical memory location of the persistent data storage medium suitable for the frequency of access.

4. The method of claim 1, wherein the histogram is weighted based on size of access requests associated with the logical block addresses, such that relatively smaller access requests are assigned higher counts in the histogram.

5. A method comprising:
determining, via a controller of a storage device, a histogram of activity over a period of time as a function of logical block addresses of the storage device, the histogram being weighted based on sizes of access requests associated with the logical block addresses such that relatively smaller access requests are assigned higher counts in the histogram, wherein address ranges that show higher levels of activity the histogram indicate regions of filesystem metadata stored on persistent data storage media of the storage device;

receiving commands via a host interface of the storage device, the commands associated with one or more logical block addresses;

determining, based on the filesystem metadata, an extent of a file that contains the one or more logical block addresses, the file being stored on the storage device; and managing storage of the one or more logical block addresses to the persistent data storage medium as a unitary data structure based on determining an association between the one or more logical block addresses and the file.

6. The method of claim 5, wherein the filesystem metadata is further determined based on a master boot record stored on the storage device.

7. The method of claim 5, wherein the filesystem metadata comprises a name of the file, and wherein the one or more logical block addresses are managed further based on a content type of the file, wherein the content type is determined based on the name of the file.

8. The method of claim 5, wherein the one or more logical block addresses are managed further based on a content type of the file, wherein the content type is determined based header data within the file.

9. The method of claim 5, wherein managing the storage of the one or more logical block addresses comprises one of more of storing the file in a selected media tier of the persistent data storage medium and compressing the file.

10. The method of claim 5, wherein managing the storage of the one or more logical block addresses comprises determining a frequency of access of the file and storing the file in physical memory location of the persistent data storage medium suitable for the frequency of access.

11. A storage device, comprising:
a controller configured to be coupled with a host interface and a persistent data storage medium, the controller configured with instructions to perform:
determining a histogram of activity over a period of time as a function of logical block addresses of the storage device, the histogram being weighted based on sizes of access requests associated with the logical block addresses such that relatively smaller access requests are assigned higher counts in the histogram, wherein address ranges that show higher levels of activity indicate regions of filesystem metadata stored on the storage medium;
receiving commands via the host interface, the commands associated with one or more logical block addresses;
determining, based on the filesystem metadata, an extent of a file that contains the one or more logical block addresses, the file being stored on the storage medium; and
managing storage of the one or more logical block addresses to the persistent data storage medium as a unitary data structure based on determining an association between the one or more logical block addresses and the file.

12. The storage device of claim 11, wherein the filesystem metadata is determined based on a master boot record stored on the storage device.

13. The storage device of claim 11, wherein the filesystem metadata comprises a name of the file, and wherein the one or more logical block addresses are managed further based on a content type of the file, wherein the content type is determined based on the name of the file.

14. The storage device of claim 11, wherein the one or more logical block addresses are managed further based on a content type of the file, wherein the content type is determined based header data within the file.

15. The storage device of claim 11, wherein managing the storage of the one or more logical block addresses comprises one or more of storing the file in a selected tier of the persistent data storage medium and compressing the file.

16. The storage device of claim 11, wherein managing the storage of the one or more logical block addresses comprises determining a frequency of access of the file and storing the file in physical memory location of the persistent data storage medium suitable for the frequency of access.

17. A method comprising:
receiving commands via a host interface of a storage device, the commands associated with logical block addresses;
determining a histogram of activity over a period of time as a function of the logical block addresses based on the commands, wherein address ranges that show relatively high levels of activity in the histogram indicate regions of filesystem metadata and also indicate a region of virtual memory, wherein the region of virtual memory is distinguished from the filesystem metadata based on levels of activity during system startup;
determining, based on a timing and sequence of the commands associated with the regions of the filesystem metadata, an extent of a file that contains the logical block addresses, the file being stored on a persistent data storage medium of the storage device; and
managing storage of the logical block addresses to the persistent data storage medium as a unitary data structure based on determining an association between the logical block addresses and the file.

* * * * *